United States Patent
Takahashi

[11] Patent Number: 5,299,189
[45] Date of Patent: Mar. 29, 1994

[54] TDMA PROCESSING APPARATUS

[75] Inventor: Katsumi Takahashi, Hyogo, Japan

[73] Assignee: Mitsubishi Denki Kabushiki Kaisha, Tokyo, Japan

[21] Appl. No.: 859,873

[22] Filed: Mar. 30, 1992

[30] Foreign Application Priority Data

Jul. 19, 1991 [JP] Japan .................. 3-203619

[51] Int. Cl.$^5$ .......................... H04J 3/02; G06F 13/00
[52] U.S. Cl. ................................. 370/58.2; 370/85.1;
370/95.3; 375/7; 395/325; 395/375
[58] Field of Search ................. 370/58.1, 58.2, 67,
370/85.1, 110.1, 95.1, 95.3, 94.1, 112; 375/7, 8;
395/275, 325, 375, 425; 364/200 MS File, 900 MS File

[56] References Cited

U.S. PATENT DOCUMENTS

| | | | |
|---|---|---|---|
| 4,086,626 | 4/1978 | Chung | 395/425 |
| 4,112,490 | 9/1978 | Pohlman et al. | 395/325 |
| 4,313,193 | 1/1982 | Nakano et al. | 370/112 |
| 4,334,268 | 6/1982 | Boney et al. | 395/375 |
| 4,371,925 | 2/1983 | Carberry et al. | 370/85.1 |
| 4,646,232 | 2/1987 | Chang et al. | 395/325 |
| 4,656,619 | 4/1987 | Hotta et al. | 370/95.3 |
| 5,138,610 | 8/1992 | Kohlmann et al. | 370/58.2 |

FOREIGN PATENT DOCUMENTS 60-16740 1/1985 Japan .

*Primary Examiner*—Douglas W. Olms
*Assistant Examiner*—Alpus H. Hsu
*Attorney, Agent, or Firm*—Rothwell, Figg, Ernst & Kurz

[57] ABSTRACT

Disclosed herein is a TDMA processing apparatus suitable for use in communication equipment for performing a communications service of a TDMA system. The TDMA processing apparatus can be reduced in size and manufactured at a low cost. The TDMA processing apparatus includes a one-chip microcomputer, which has a timer unit to which a preset value corresponding to each control-signal outputting timing as viewed from a reference point is set and for counting input reference clock pulses so as to make an interrupt request when the count reaches a preset value. In addition, the TDMA processing apparatus generates a control signal in response to the interrupt request.

10 Claims, 14 Drawing Sheets

F I G. 11
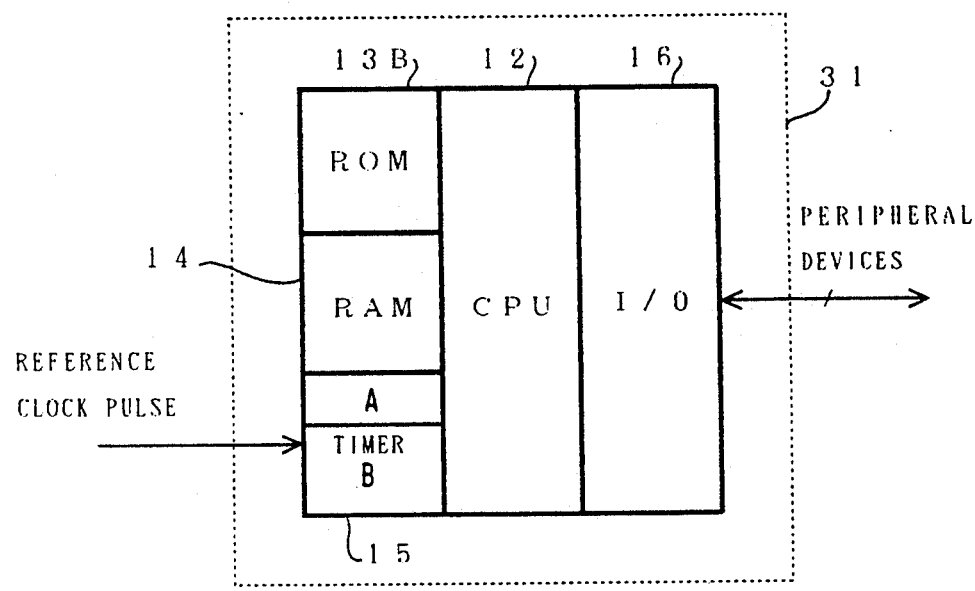
F I G. 12
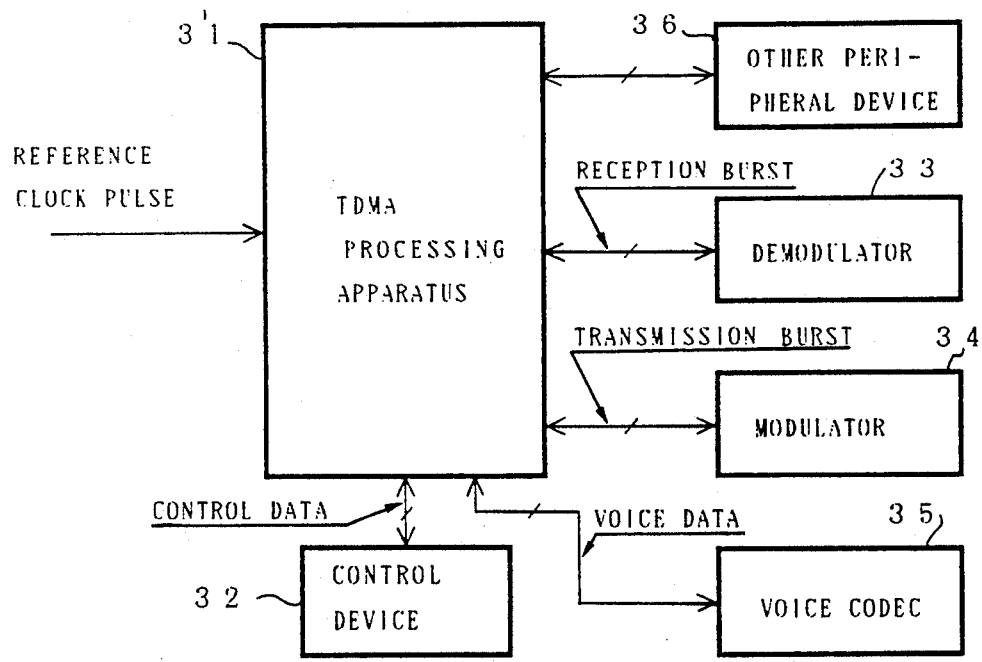

FIG. 15
(A)
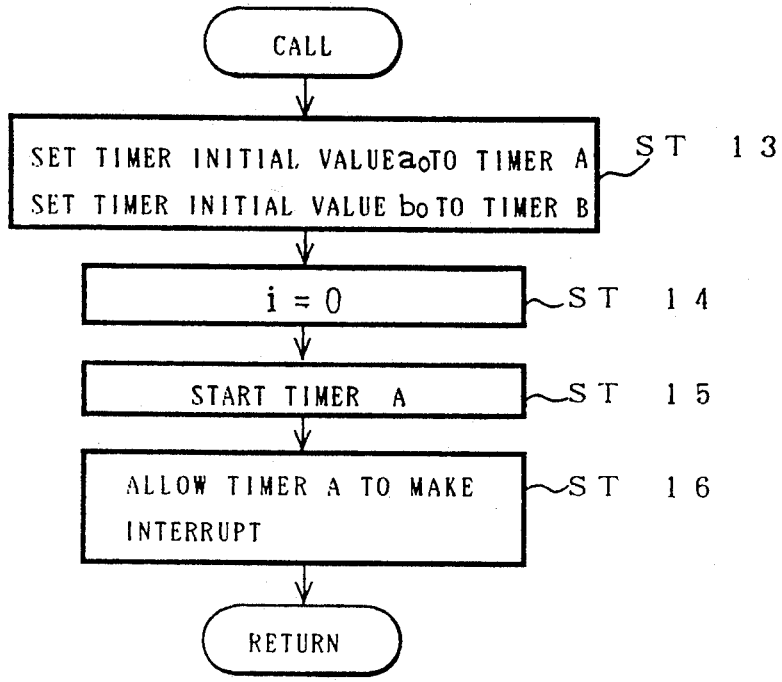
(B)
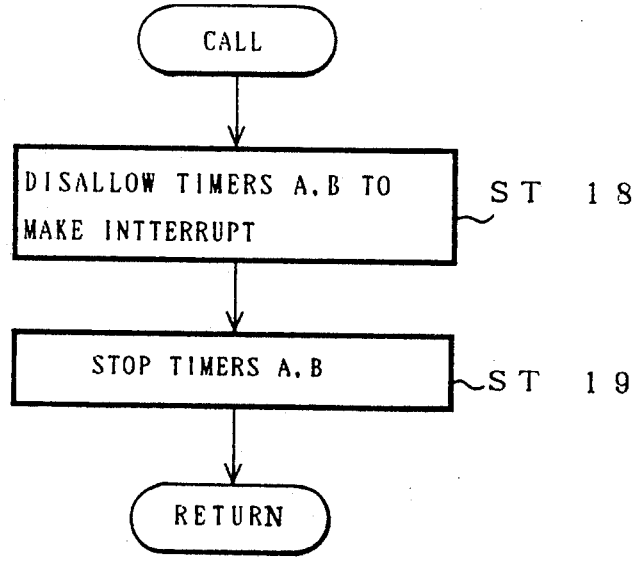

TDMA PROCESSING APPARATUS

BACKGROUND OF THE INVENTION

1. Field of the Invention

The present invention relates to a TDMA processing apparatus suitable for use in communication equipment of a TDMA system.

2. Description of the Related Art

FIG. 1 is a block diagram showing a conventional TDMA processing apparatus. The TDMA processing apparatus is used to supply given control signals to peripheral devices such as a modulator and demodulator, a transmit-receive unit, a frequency synthesizer, etc. in given timing. In FIG. 1, there are shown a counter 1 for counting input reference clock pulses, a memory 2 for specifying an address in response to the count of the counter 1, and an output buffer 3 for supplying data output from the memory 2 to each of the peripheral devices under the control of an external device. The elements 1, 2 and 3 are connected to peripheral devices to form a complete communication transmitter/receiver. The peripheral devices typical in such prior art TDMA communication transmitter/receiver are shown in block 4. These include a modulator 4a, a transmitter 4b, a frequency synthesizer 4c, a demodulator 4d, a receiver 4e and a duplexer 4f. An antenna 5 is typically connected to the system through the duplexer 4f.

FIG. 2 shows frame and burst structures employed in a TDMA system based on the EIA IS-54 standard. The frame structure will now be described below by way of example. Let's now assume that three slots represent one frame, one slot is made up of m bits and the time needed to transmit one frame is n seconds. Incidentally, an "SACCH", a "DATA", a "CDVCC", a "RSV", a "SYNC", a "G", and a "R" represent a slow-speed type attached control channel, a voice channel or a high-speed type attached control channel, a coded identification color code, a reserve area, a synchronizing word, a guard time interval, and a lamp time interval, respectively.

In this case, the data transfer rate is 3 m/n (bits/second), and the transfer time per bit is n/3 m (seconds). In order to reliably carry out the operation of each of the peripheral devices, it is necessary to perform the timing control for supplying a control signal to each of the peripheral devices at a time interval shorter than the transfer time per bit. If the time interval referred to above is one-xth the transfer time per bit, then the timing control makes it necessary to be carried out at a time interval of n/3 mx (seconds).

The operation of the TDMA processing apparatus will now be described below. From the above description, the period of the reference clock pulses becomes n/3 mx. The counter 1 counts the reference clock pulses. When one clock pulse is input to the counter 1 at the time that the count of (3 mx−1) is reached, the counter 1 develops the count 0. That is, the counter 1 circularly counts at 3 mx indicative of the number of control timings in one frame. The width of the output from the counter 1 is $\log_2 3$ mx bits, and its output is input to a desired address in the memory 2.

Let's now consider that the control signals supplied to the peripheral devices are classified into y types. In this case, the memory 2 is organized as shown in FIG. 3 so that the contents of 3 mx words (one word being made up of y bits) in total can be stored. In addition, data of y bits, which has been stored at an address specified by the output of the counter 1, is delivered to the output buffer 3.

The output buffer 3 is supplied with output control signals each indicative of either output permission or output nonpermission corresponding to each bit. The output buffer 3 now supplies to a desired peripheral device, data of each bit corresponding to the output permission, of data input thereto. Thus, the output buffer 3 delivers control signals to the peripheral devices for each frame cycle at a rate x times the data transfer rate. Incidentally, the control signals represent an instruction for the changeover of a frequency of the frequency synthesizer and an instruction for starting up or disabling the transmit-receive unit, for example.

The conventional TDMA processing apparatus constructed as described above needs the memory 2 having the capacity proportional to the number of bits per frame, i.e., 3 m. Since the width of data in a memory element is normally either 8 bits or 16 bits, memory elements represented in the form of required data width y/data width of memory element (number) are needed. In addition, a large number of memory elements should be provided as the memory 2 as the number of the control signals fed to the peripheral devices increases, thereby causing the problem that circuits employed in the TDMA processing apparatus should be designed on a large scale, and the manufacturing cost of the TDMA processing apparatus becomes expensive.

Incidentally, the conventional TDMA processing apparatus has been disclosed in Japanese Patent Application Laid-Open No. 60-16740.

SUMMARY OF THE INVENTION

With the foregoing problem in view, it is therefore an object of the present invention to provide a TDMA processing apparatus of a type wherein circuits employed therein can be designed on a small scale and a further reduction in the manufacturing cost is enabled.

According to one aspect of the present invention, there is provided a TDMA processing apparatus comprising a one-chip microcomputer, which includes a timer unit for counting input reference clock pulses so as to make an interrupt request when the count reaches a preset value; an output port unit for outputting control signals to peripheral devices respectively; a read only memory (ROM) unit for storing therein a program used to activate the timer unit so as to set a first preset value to the timer unit, the read only memory unit being activated in response to the interrupt request and storing an interrupt-serving program therein, the interrupt-serving program being used to set a control signal corresponding to the preset value contributing to the generation of the interrupt request, to the output port unit and to set preset values corresponding to the timing for outputting the control signals to be applied to the peripheral devices, to the timer unit; and a central processing unit (CPU) for executing the respective programs stored in the read only memory unit.

According to another aspect of the present invention, there is provided a TDMA processing apparatus comprising a timer for counting input reference clock pulses so as to generate an interrupt request signal when the count reaches a preset value; an output port for outputting control signals to peripheral devices respectively; a ROM for storing therein a program used to activate the timer so as to set a first preset value to the timer, the ROM being activated in response to the interrupt request signal and storing an interrupt-serving program therein, the interrupt-serving program being used to set a control signal corresponding to the preset value contributing to the generation of the interrupt request signal, to the output port and to set preset values corresponding to the timing for outputting the control signals to be applied to the peripheral devices, to the timer; and a CPU for executing the respective programs stored in the ROM.

Each of the respective programs stored in the ROM is executed to set the preset value used to determine the timing for outputting each of the control signals applied to the peripheral devices, to the timer unit (or timer).

According to a further aspect of the present invention, there is provided a TDMA processing apparatus comprising a one-chip microcomputer, which includes a timer unit for counting input reference clock pulses so as to make an interrupt request when the count reaches a preset value; an output port unit for supplying control signals to peripheral devices respectively; a ROM unit for storing therein a program used to activate the timer unit so as to set a first preset value to the timer unit, the ROM being activated in response to the interrupt request and storing an interrupt-serving program therein, the interrupt-serving program being used to set a control signal corresponding to the preset value contributing to the generation of the interrupt request, to the output port unit and to set preset values corresponding to the timing for outputting the control signals to be applied to the peripheral devices, to the timer unit, the ROM also storing therein a program, which is used to receive a reception burst from the demodulator in burst reception timing determined by the execution of the interrupt-serving program so as to disassemble the reception burst and to assemble a transmission burst on the basis of data supplied from one of the peripheral devices thereby to deliver the assembled transmission burst to the modulator in burst transmission timing determined by the execution of the interrupt-serving program; and a CPU for executing the respective programs stored in the ROM unit.

The respective programs in the ROM are executed to set the preset value used to determine the timing for outputting each of the control signals to be applied to the peripheral devices, to the timer unit, and to set the preset values used to determine the timing for inputting the reception burst and the timing for outputting the transmission burst, to the timer unit.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 11 is a block diagram showing a TDMA processing apparatus according to a fourth embodiment of the present invention;

FIG. 12 is a block diagram illustrating the TDMA processing apparatus shown in FIG. 11 and respective peripheral devices;

FIG. 15 is a flowchart for describing another part of the operations of the TDMA processing apparatus depicted in FIG. 11;

DETAILED DESCRIPTION OF THE PREFERRED EMBODIMENTS

Figure 4:
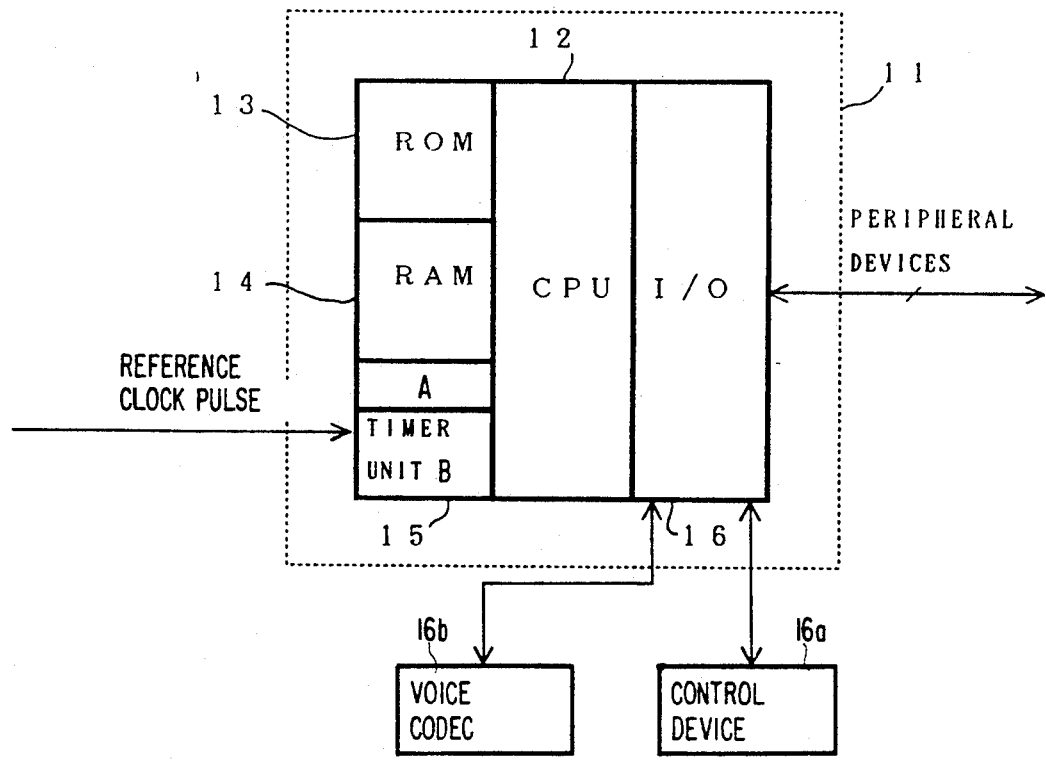
FIG. 4 is a block diagram illustrating a TDMA processing apparatus according to a first embodiment of the present invention.

Preferred embodiments of the present invention will hereinafter be described with reference to the accompanying drawings. FIG. 4 is a block diagram showing the structure of a TDMA processing apparatus according to a first embodiment of the present invention. Referring ring to FIG. 4, numeral 11 indicates a one-chip microcomputer, which basically comprises a CPU 12, a ROM 13 having programs stored therein, a RAM 14 for temporarily storing data therein, a timer unit 15 for counting input reference clock pulses, and an input/output port (I/O port) 16 used to transmit data to or receive data from peripheral devices such as a control device 16a, a voice codec 16b, a modulator and demodulator (modem), a transmit-receive unit, a frequency synthesizer, etc.

The operation of the TDMA processing apparatus will now be described below. The timer unit 15 counts the reference clock pulses and has two timers, i.e., a timer A and a timer B. As the frequency of the reference clock pulses, for example, 3 mx/n (Hz) is used in a manner similar to that of conventional reference clock pulses.

Figure 5:
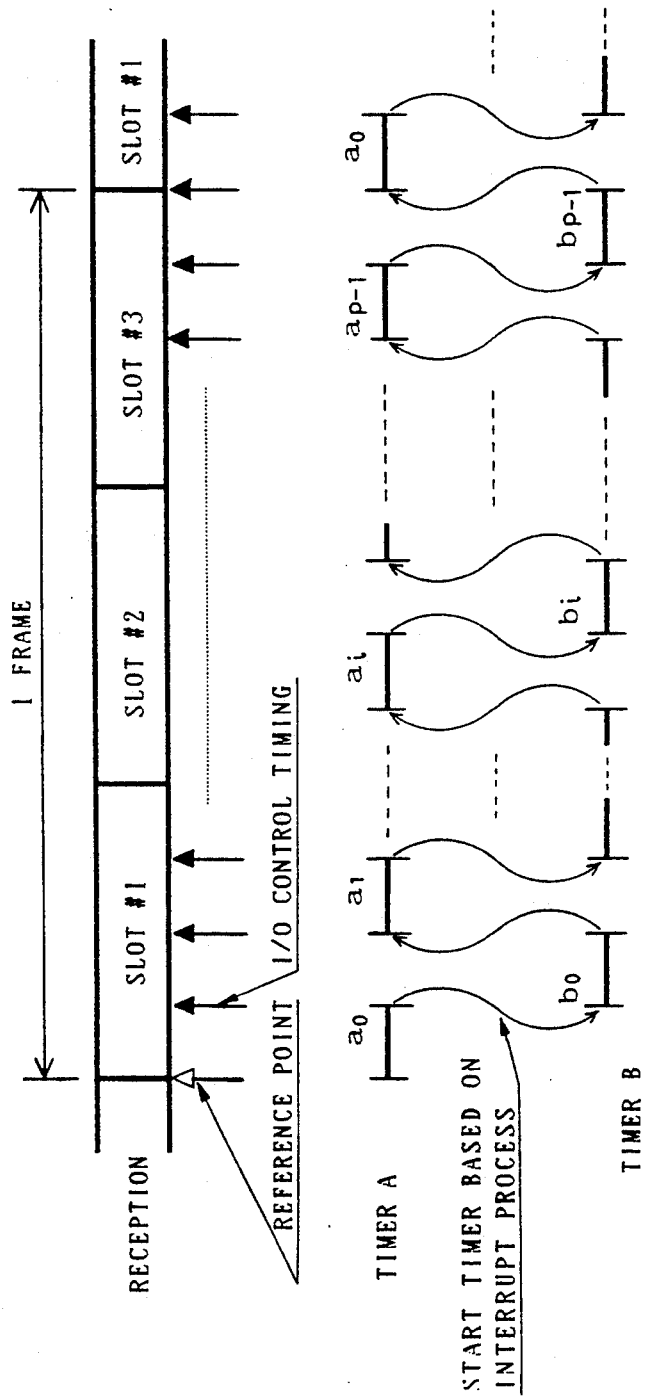
FIG. 5 is a diagram for describing the operation of each of timers A and B.

FIG. 5 is a diagram for describing the operation of each of the timers A and B. Let's now consider a starting point of a reception slot #1 as a reference point, for example. When the timer A starts counting so as to produce the count of $a_0$ as a first preset value, a given control signal is applied to a predetermined bit zone of the I/O port 16. The term of the "given control signal" represents a control signal supplied to each of circuits of the peripheral devices which is to start to operate (or stop their operations or change the same) when the time corresponding to the count of $a_0$ has elapsed from the starting point of the reception slot #1. The signal will hereinafter be referred to as "a control signal corresponding to the preset value $a_0$". At this time, a preset value $b_0$ is set to the timer B so as to activate the timer B. Let's now assume that the number of timings at which the control signal supplied to each of the peripheral devices is output is 2P in one frame as shown in FIG. 5. After the timer B has counted the preset value $b_0$, a control signal corresponding to the preset value $b_0$ is applied to a predetermined bit zone of the I/O port 16. Thereafter, the timers A and B are alternately activated to count their preset values. Then, control signals corresponding to the counted preset values are supplied to corresponding predetermined bit zones of the I/O port 16.

Figure 6:
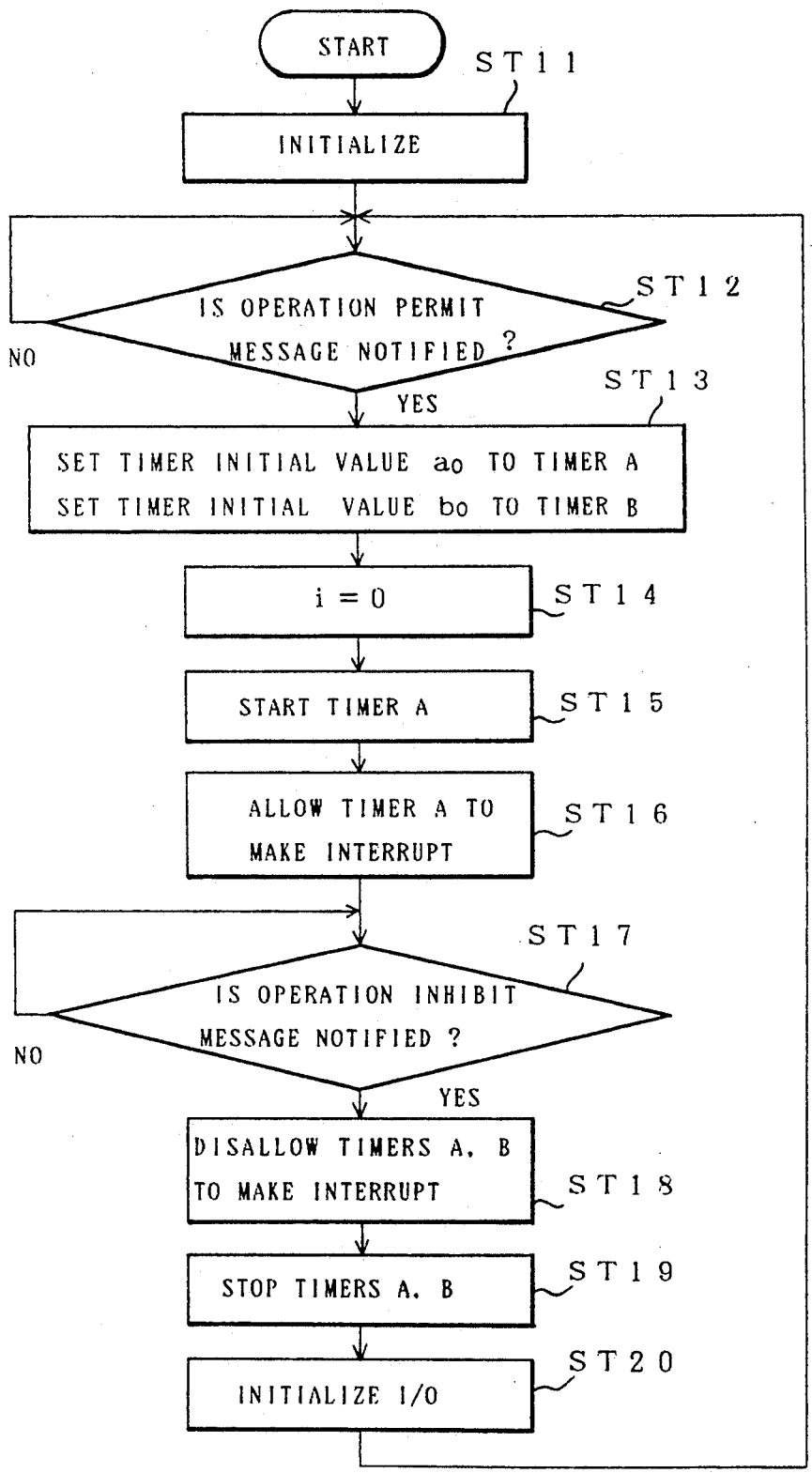
FIG. 6 is a flowchart for describing a part of operations of the TDMA processing apparatus shown in FIG. 4.

The operation of the CPU 12 which executes the respective programs stored in the ROM 13, will specifically be described below. When the CPU 12 is reset, the CPU 12 is activated in accordance with a flowchart shown in FIG. 6. First of all, the CPU 12 initializes the RAM 14, the timer unit 15 and the I/O port 16 or the like (Step ST11). When the CPU 12 is informed of an operation permit message (Step ST12), it serves to set preset values $a_0$, $b_0$ to the timers A, B respectively (Step ST13). The operation permit message is given at the reference point shown in FIG. 5 from, for example, a control device of communication equipment, i.e., a communication transmitter/receiver incorporating the TDMA processing apparatus therein. The CPU 12 initially sets the value of a pointer i to zero (Step ST14). Then, the CPU 12 sets the timer A to an active state (Step ST15), and the CPU 12 is brought to a state in which it is capable of accepting an interrupt request caused by the count-up of the timer A (Step ST16). The CPU 12 hereafter sets a control signal to the I/O port 16 based on an interrupt-serving program, i.e., supplies a control signal to each of the peripheral devices. When the CPU 12 is externally informed of an operation inhibit message (Step ST17), the CPU 12 is brought to a state in which it does not receive an interrupt request caused by the count-up of each of the timers A, B (Step ST18). Further, the CPU 12 sets each of the timers A and B to an inactive state (Step ST19), and initializes the I/O port 16 (Step ST20).

Figure 7:
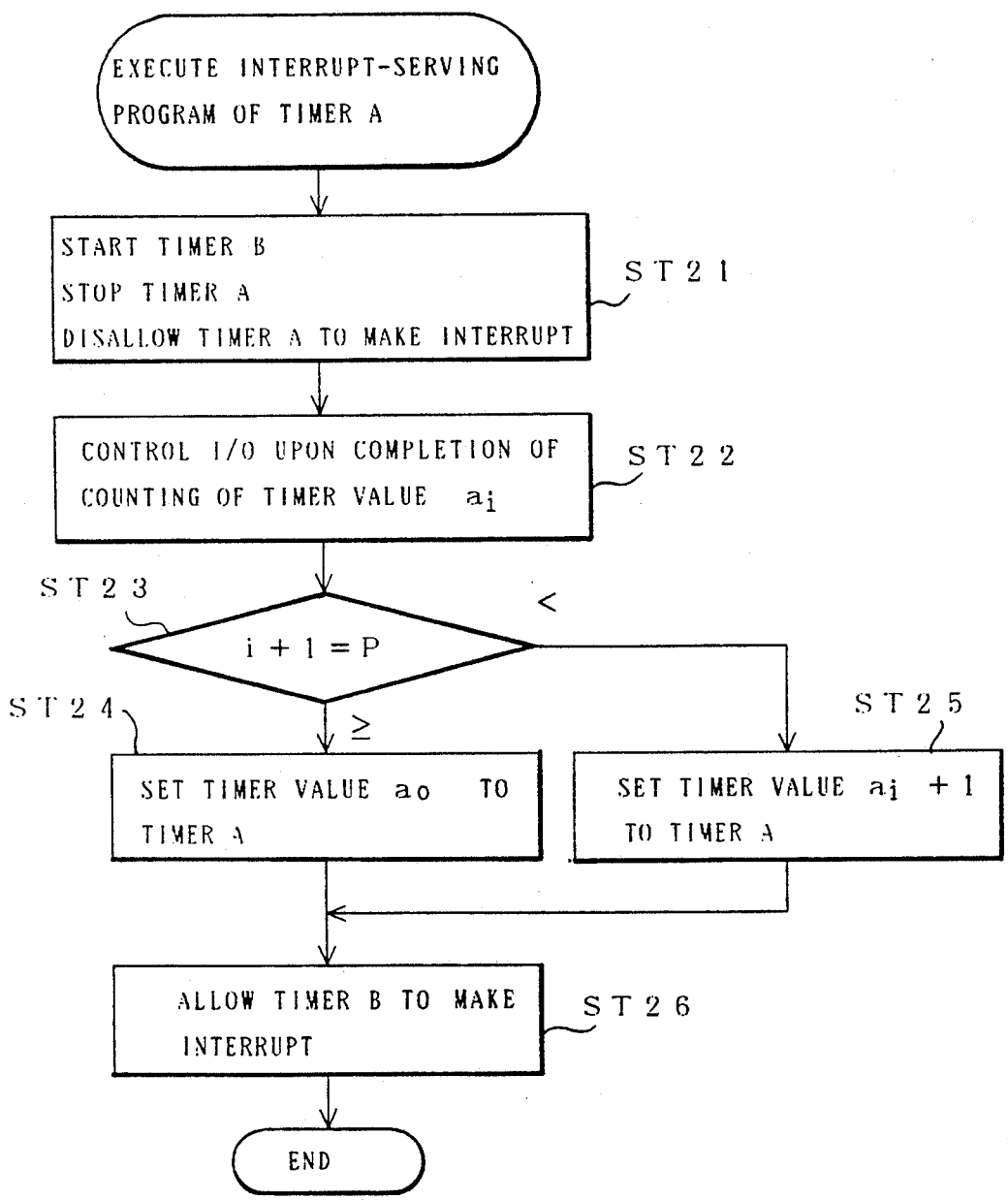
FIG. 7 is a flowchart for describing a program for processing an interrupt triggered by the timer A employed in the TDMA processing apparatus shown in FIG. 4.

After the timer A has counted a preset value $a_i$, it produces an interrupt request. The CPU 12 executes an interrupt-serving program described in a flowchart shown in FIG. 7 in response to the interrupt request referred to above. First of all, the timer B is brought into an active state. Correspondingly, the timer B starts to count a preset value $b_i$. Then, the timer A is brought to a nonoperative state, thereby disabling the CPU 12 for the interrupt request caused by the count-up of the timer A (Step ST21).

Then, the CPU 12 sets a control signal corresponding to the preset value $a_i$ to a corresponding bit zone of the I/O port 16 (Step ST22). When the value, i.e., $i+1$ obtained by adding 1 to the value of a pointer "i" is equal to P, an interrupt caused by the count-up of a preset value $a_{p-1}$ by the timer A takes place. That is, the timing control in a given frame by the timer A has completely been finished. Therefore, the CPU 12 sets the first preset value $a_0$ to the timer A again (Step ST24). It is, however, determined (in Step ST23) whether or not the value of $i+1$ is more than or equal to P. When the value of $i+1$ is smaller than P, the timing control in the given frame by the timer A has not yet completed. Therefore, the CPU 12 sets the next preset value $a_{i+1}$ to the timer A (Step ST25). Then, the CPU 12 is set to a state capable of receiving an interrupt request caused by the count-up of the timer B (Step ST26).

Figure 8:
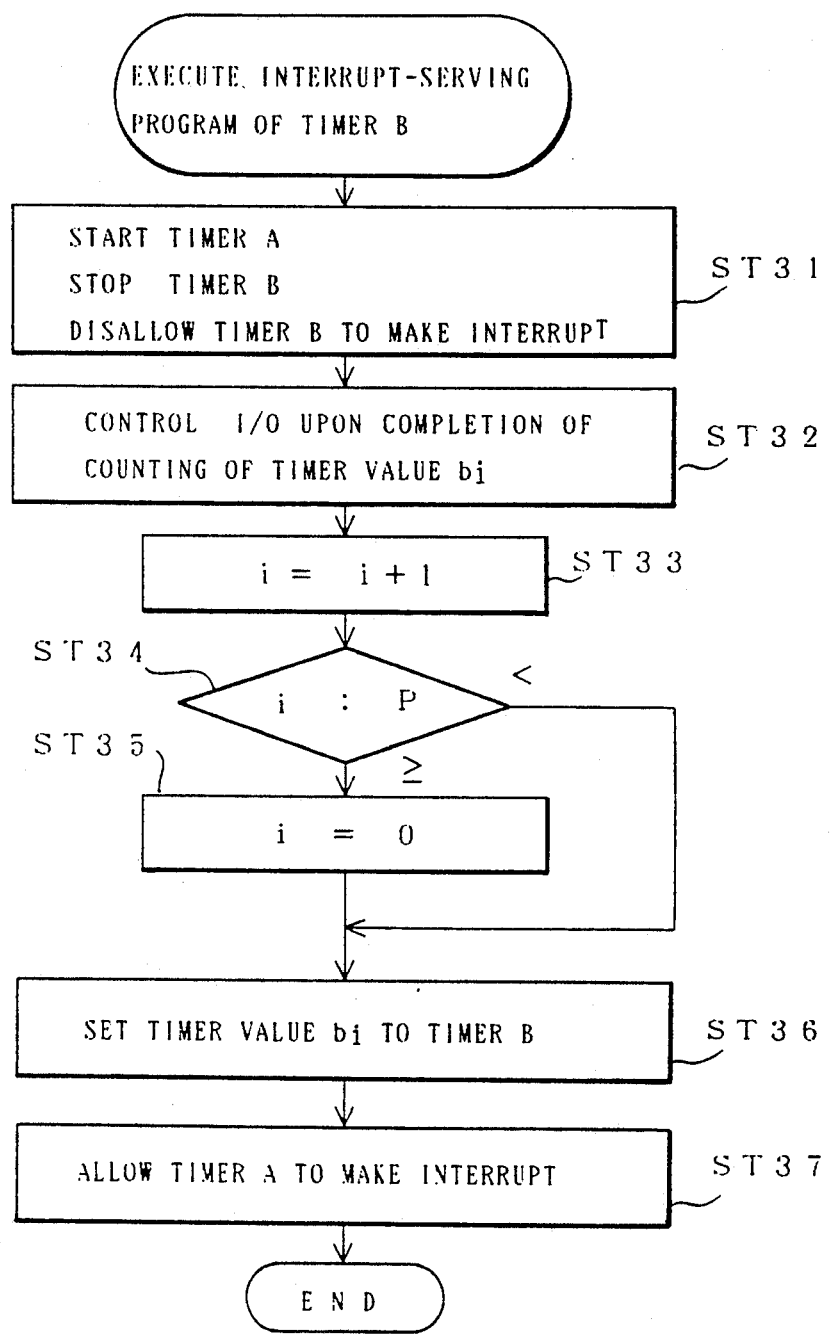
FIG. 8 is a flowchart for describing a program for processing an interrupt caused by the timer B employed in the TDMA processing apparatus depicted in FIG. 4.

When timer B has counted a preset value $b_i$, it requests an interrupt. The CPU 12 executes an interrupt-serving program expressed in a flowchart shown in FIG. 8 in response to the interrupt request referred to above. First of all, the timer A is brought into an active state. Correspondingly, the timer A starts to count a preset value $a_{i+1}$. Then, the timer B is brought to a nonoperative state, thereby disabling the CPU 12 for the interrupt request caused by the count-up of the timer B (Step ST31).

Then, the CPU 12 sets a control signal corresponding to a preset value $b_i$ to a corresponding bit zone of the I/O port 16 (Step ST32). Further, the value of the pointer "i" is incremented by 1 (Step ST32). When the value of the pointer "i" incremented by 1 is equal to P, an interrupt caused by the count-up of a preset value $b_{p-1}$ by the timer B is triggered. That is, the timing control in a given frame by the timer B has completely been terminated (the timing control in the single frame by the timer A has already been finished immediately before the timing control by the timer B). Therefore, the value of the pointer "i" is reset to an initial value of zero (Step ST35). It is, however, determined (in Step ST34) whether or not the value of the pointer "1" is more than or equal to P. Then, the CPU 12 is activated to set the next preset value $b_i$ to the timer B (Step ST36), and placed in a state in which it is enabled for an interrupt request caused by the count-up of the timer A (Step ST37).

Based on the above-described processes, the CPU 12 supplies the control signal to each of the peripheral devices in timing at which, for example, the time corresponding to $a_0$, the time corresponding to $a_0+b_0$, the time corresponding to $a_0+b_0+a_1$, . . . , elapse from the reference point. The reason for the alternate use of the timers A and B is as follows. When an interrupt process is carried out by a single timer, a value (a value $b_i$ set at the time of the interrupt process based on the count-up of the present value $a_i$ in FIG. 5) set immediately after an interrupt process based on the single timer has been made, is determined. Therefore, there is a possibility of a time delay being produced by the time required to carry out such a setting process.

Figure 9:
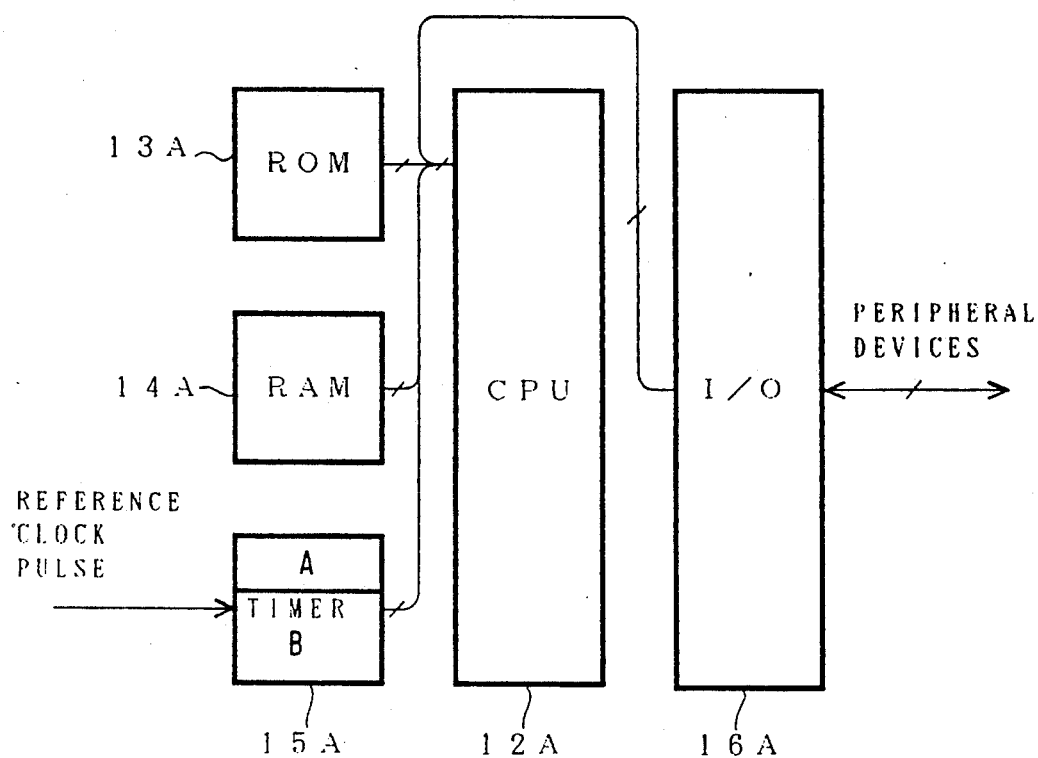
FIG. 9 is a block diagram showing a TDMA processing apparatus according to a second embodiment of the present invention.

A description will now be made of a second embodiment with reference to the accompanying drawings. In the first embodiment, the TDMA processing apparatus using the one-chip microcomputer has been described. However, a multi-chip microcomputer may be used in place of the one-chip microcomputer. FIG. 9 shows a TDMA processing apparatus using the multi-chip microcomputer. In FIG. 9, there are shown a CPU 12A, a ROM 13A with programs stored therein, a RAM 14A for temporarily storing data therein, a timer 15A for counting reference clock pulses, and an I/O port 16 for transmitting data to or receive data from each of peripheral devices.

The operation of the second embodiment is identical to that of the first embodiment. However, if the arrangement of the second embodiment is made in the above-described manner, the degree of freedom to the capacity of each of the ROM 13A, the RAM 14A, the timer 15A and the I/O port 16A and the number of these components can be improved. That is, when the one-chip microcomputer is used, the present embodiment is particularly effective in a case in which the capacity of the ROM 13 and the number of the I/O ports 16 are insufficient.

Figure 10:
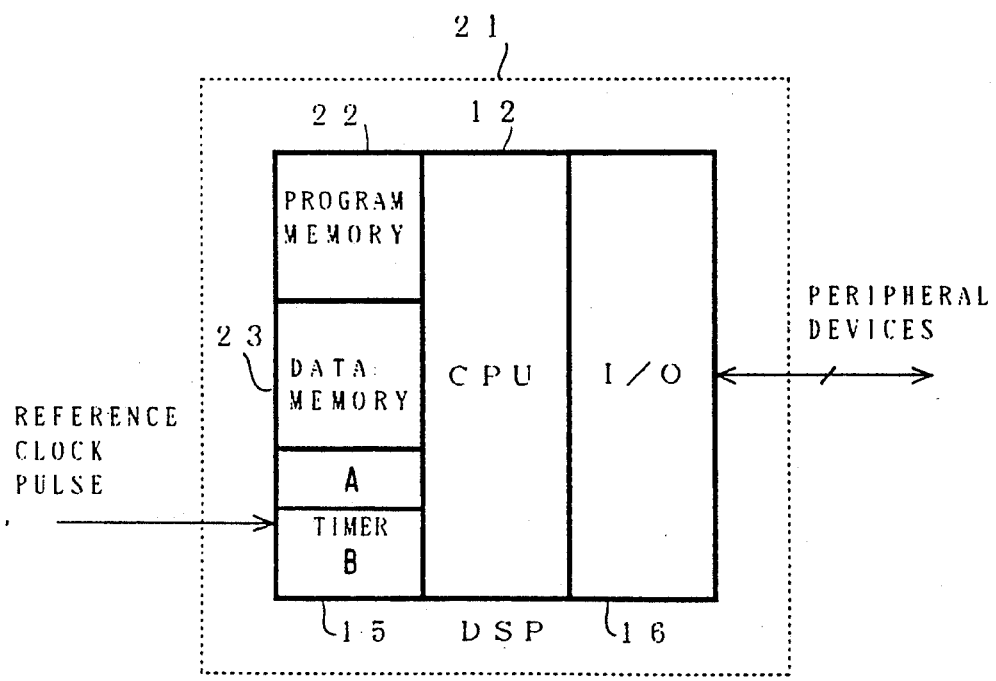
FIG. 10 is a block diagram illustrating a TDMA processing apparatus according to a third embodiment of the present invention.

Then, a third embodiment of the present invention will be described below. In the third embodiment, a DSP may be used as an alternative to the one-chip microcomputer. FIG. 10 shows a TDMA processing apparatus using the DSP. In FIG. 10, there are shown a DSP 21, a program memory 22 with programs stored therein, and a data memory 23 for temporarily storing data therein. The operation of the third embodiment is identical to that of the first embodiment, and its description will therefore be omitted.

A description will now be made of a fourth embodiment. Each of the above-described embodiments has described the TDMA processing apparatus which performs the timing control of the control signal. As an alternative, however, a TDMA processing apparatus may be used which carries out processes such as detection of a synchronizing word, decomposition or disassembling of a reception burst, assembly of a transmission burst, error control of reception/transmission bursts as well as the timing control.

FIG. 11 shows this type of TDMA processing apparatus designated at numeral 31. A ROM 13B stores therein other programs in addition to the programs stored in the ROM 13 shown in FIG. 4. FIG. 12 shows the TDMA processing apparatus together with respective peripheral devices. In FIG. 12, there are shown a control device 32 used to transmit control data to or receive data from the TDMA processing apparatus 31, a demodulator 33 for subjecting data from the TDMA processing apparatus 31 to a demodulating process so as to output a reception burst thereto, a modulator 34 for subjecting data from the TDMA processing apparatus 31 to a modulating process so as to output a transmission burst thereto, a voice codec 35 for digitally coding a voice signal and converting coded data into a voice signal, and an another peripheral device 36.

Figure 1:
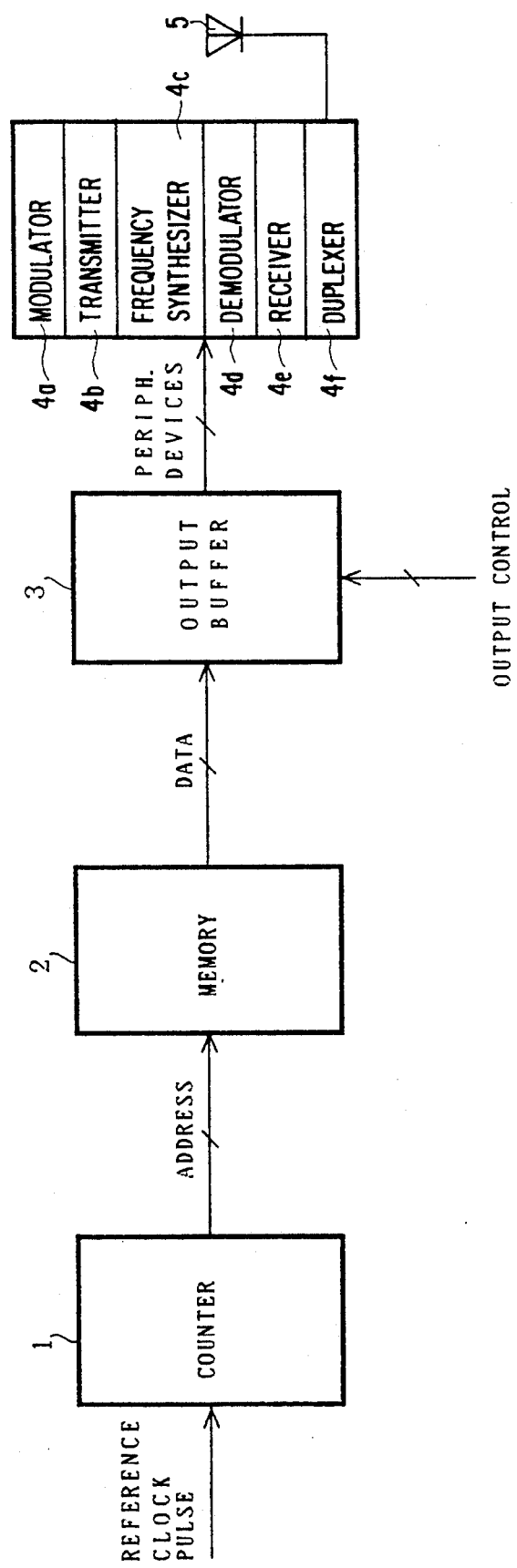
FIG. 1 is a block diagram showing a conventional TDMA processing apparatus.
Figure 2:
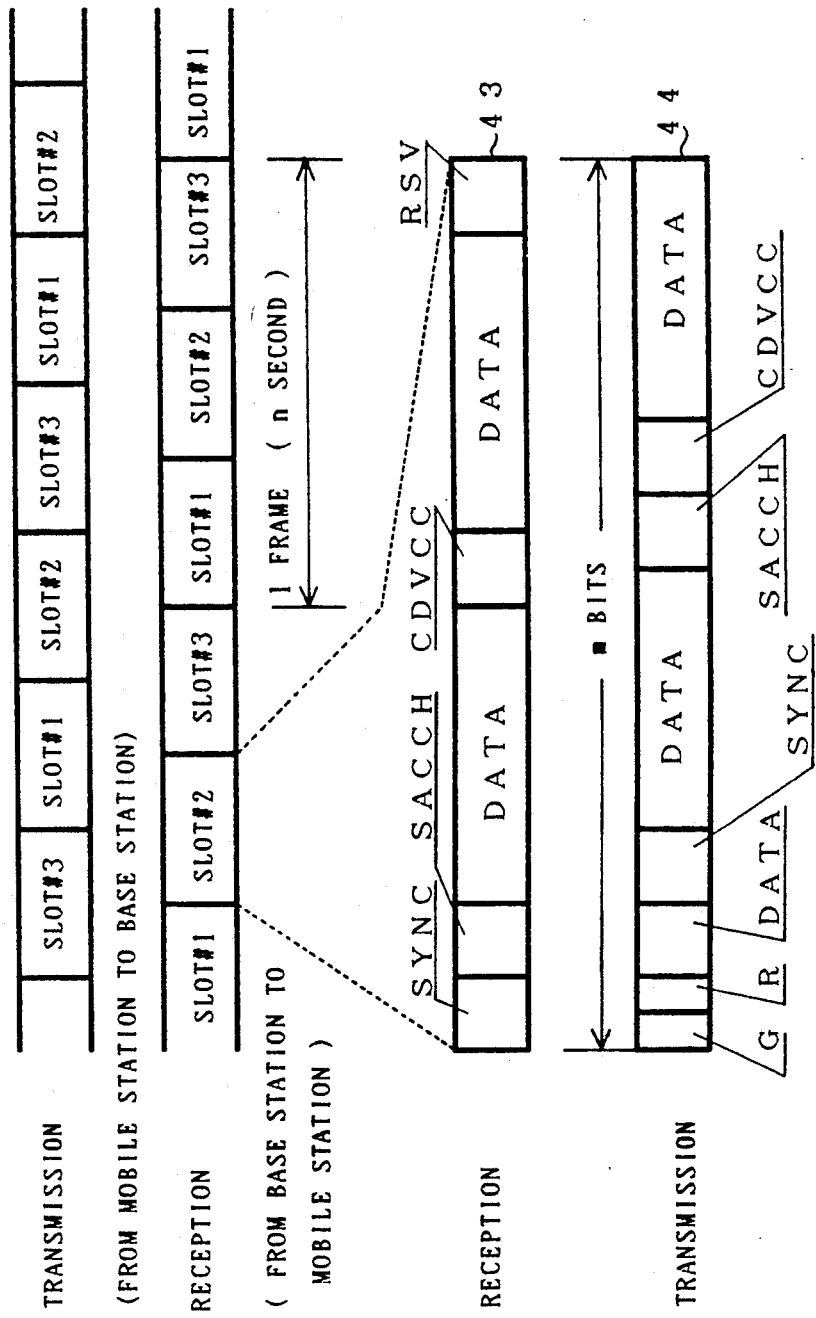
FIG. 2 is a diagram for describing one example of slot and burst structures.
Figure 3:
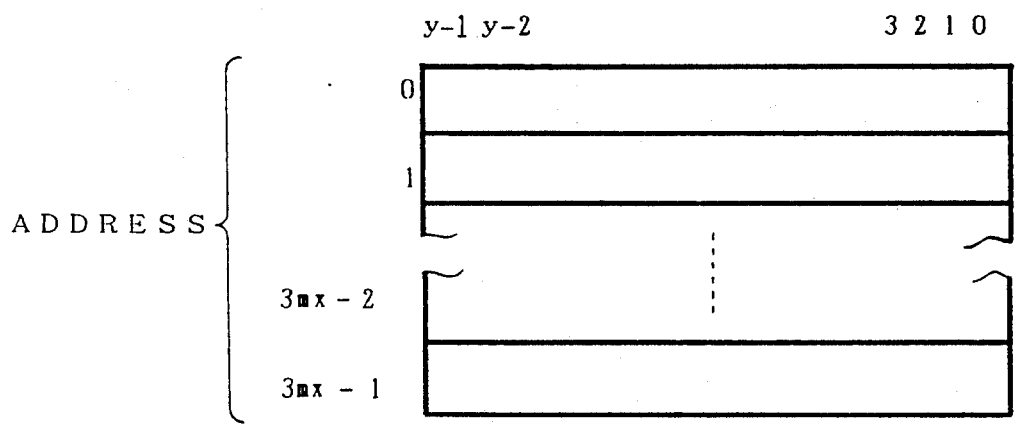
FIG. 3 is a diagram for describing the structure of a memory shown in FIG. 1.
Figure 13:
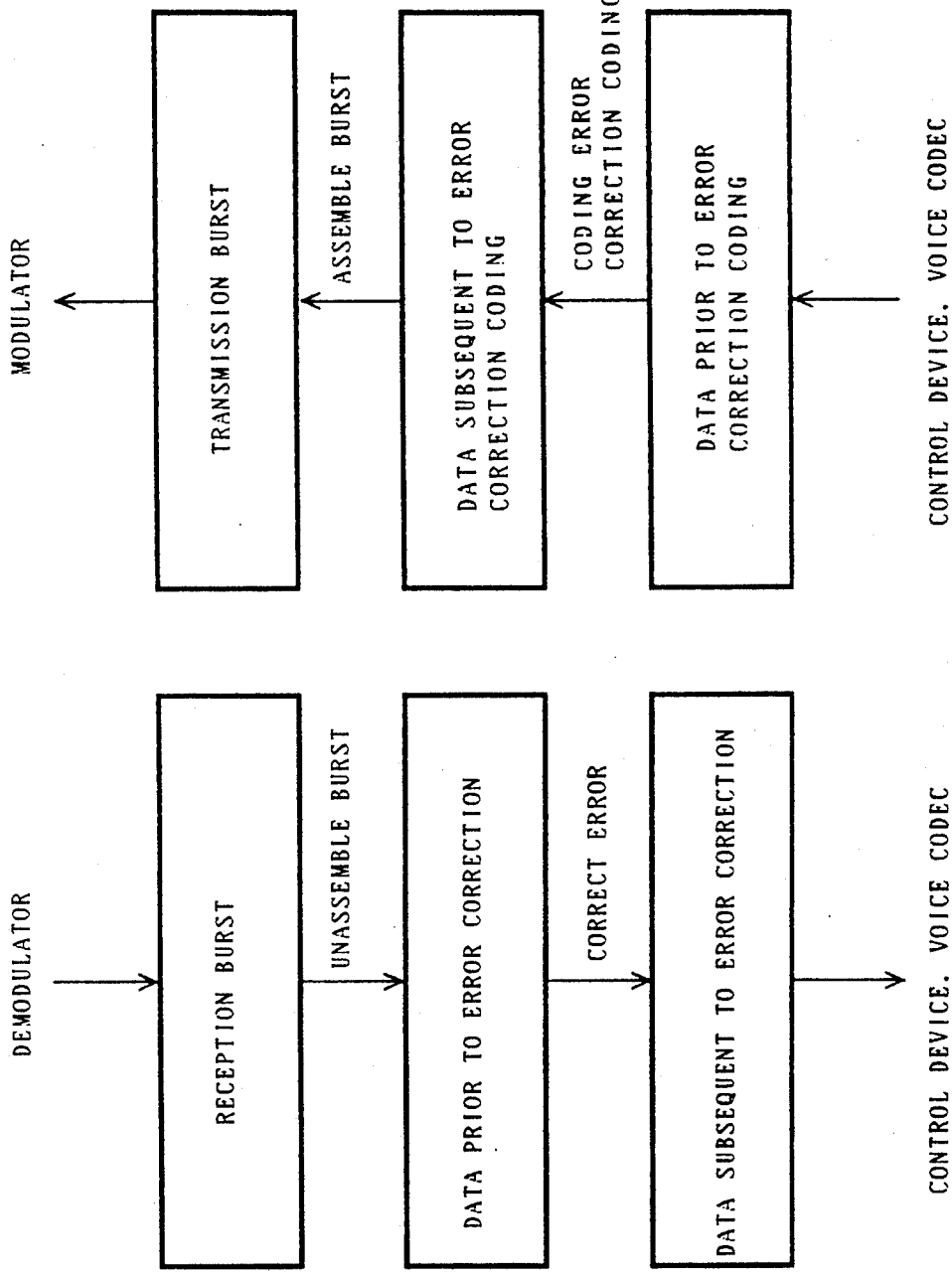
FIG. 13 is a diagram for describing the flow of each of receive data, a reception burst, transmit data and a transmission burst.

The operation of the fourth embodiment will now be described below. FIG. 2 shows frame and burst structures. FIG. 13(A) shows the flow of either a reception burst 43 or data in the reception burst 43, whereas FIG. 13(B) illustrates the flow of either a transmission burst 44 or data in the transmission burst 44. A reception burst 43 output from the demodulator 33 is decomposed or disassembled by the TDMA processing apparatus 31. The TDMA processing apparatus 31 performs error control processes such as deinterleave, error correction, etc. with respect to a DATA section and a SACCH section. The data thus processed are delivered to either the control device 32 or the voice codec 35. Then, the TDMA processing apparatus 31 performs error control processes such as addition of error correcting codes, interleave, etc. with respect to the data delivered from the control device 32 and/or the voice codec 35. The data thus processed are assembled together with a synchronizing code and a coded identifying color code into the transmission burst 44. Then, the transmission burst 44 thus assembled is supplied to the modulator 33.

Figure 14:
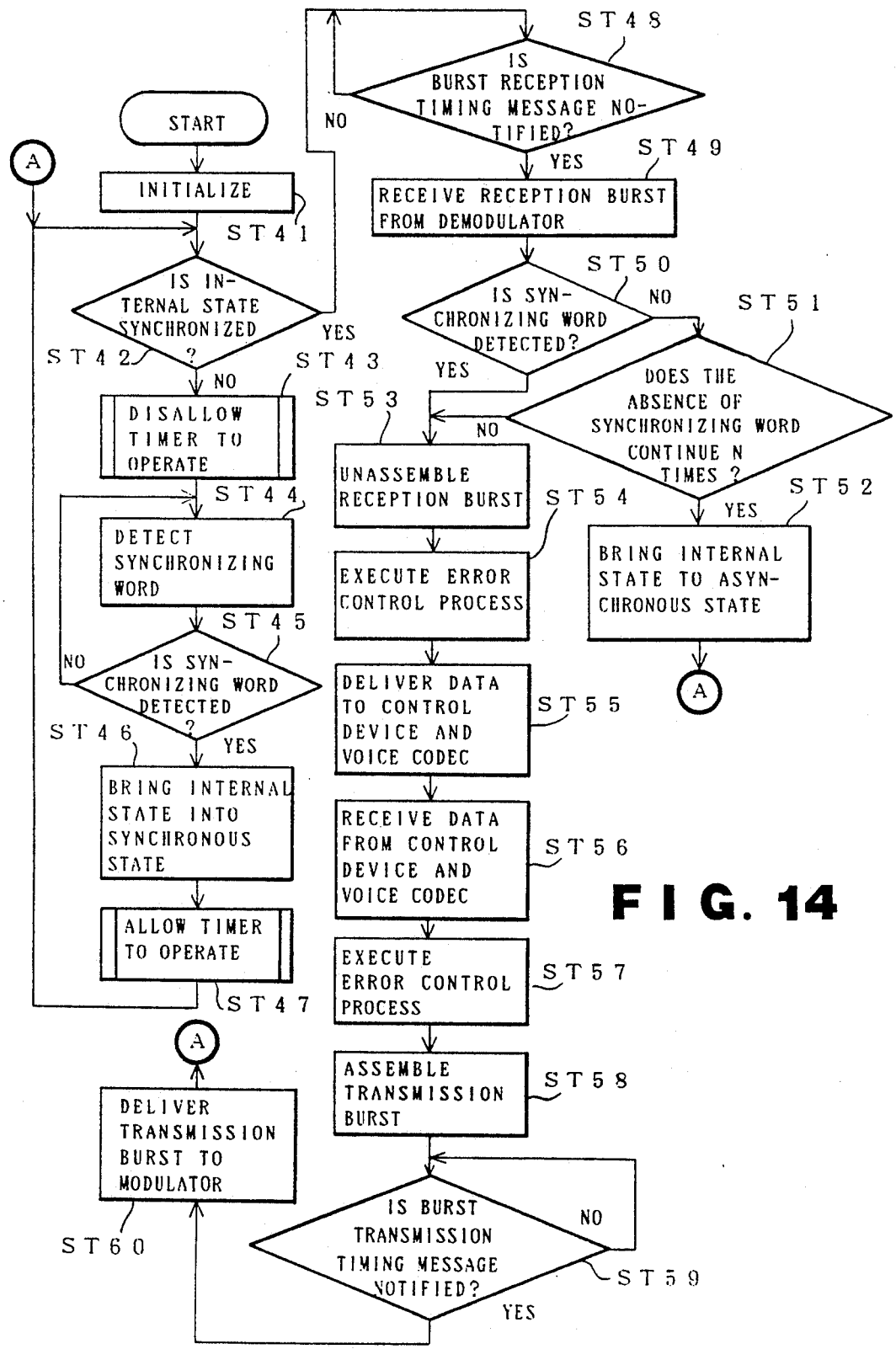
FIG. 14 is a flowchart for describing a part of operations of the TDMA processing apparatus shown in FIG. 11.

At this time, the TDMA processing apparatus 31 is operated in the following manner. When the CPU 12 is reset, the CPU 12 is activated in accordance with a flowchart shown in FIG. 14. The CPU 12 first initializes the RAM 14, the timer unit 15 and the I/O port 16 or the like (Step ST41). Then, the CPU 12 will check for internal states of these components referred to above (Step ST42). If it is determined that each internal state does not represent a synchronous set-up state, then the CPU 12 performs a process for disallowing the operation of the timer unit 15 (Step ST43). More specifically, the CPU 12 performs a routine process shown in FIG. 15(B). Then, the CPU 12 is supplied with a reception burst from the demodulator 33 and detects a synchronizing word (Step ST44). If the synchronizing word is detected (Step ST45), then the CPU 12 brings the internal states to the synchronous set-up state (Step ST46), and allows the operation of the timer unit 15 (Step ST47).

Figure 16:
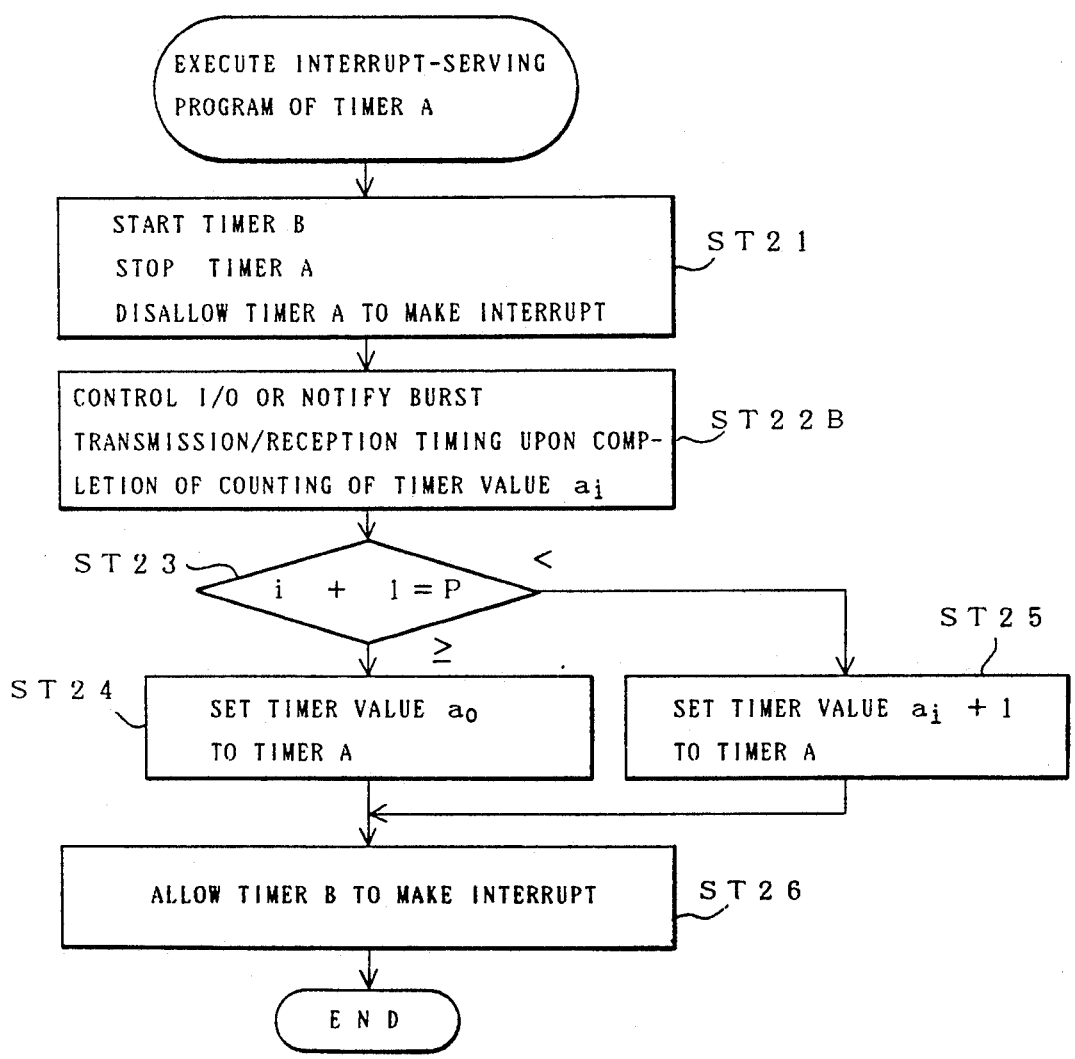
FIG. 16 is a flowchart for describing a program for processing an interrupt caused by a timer A employed in the TDMA processing apparatus shown in FIG. 11.
Figure 17:
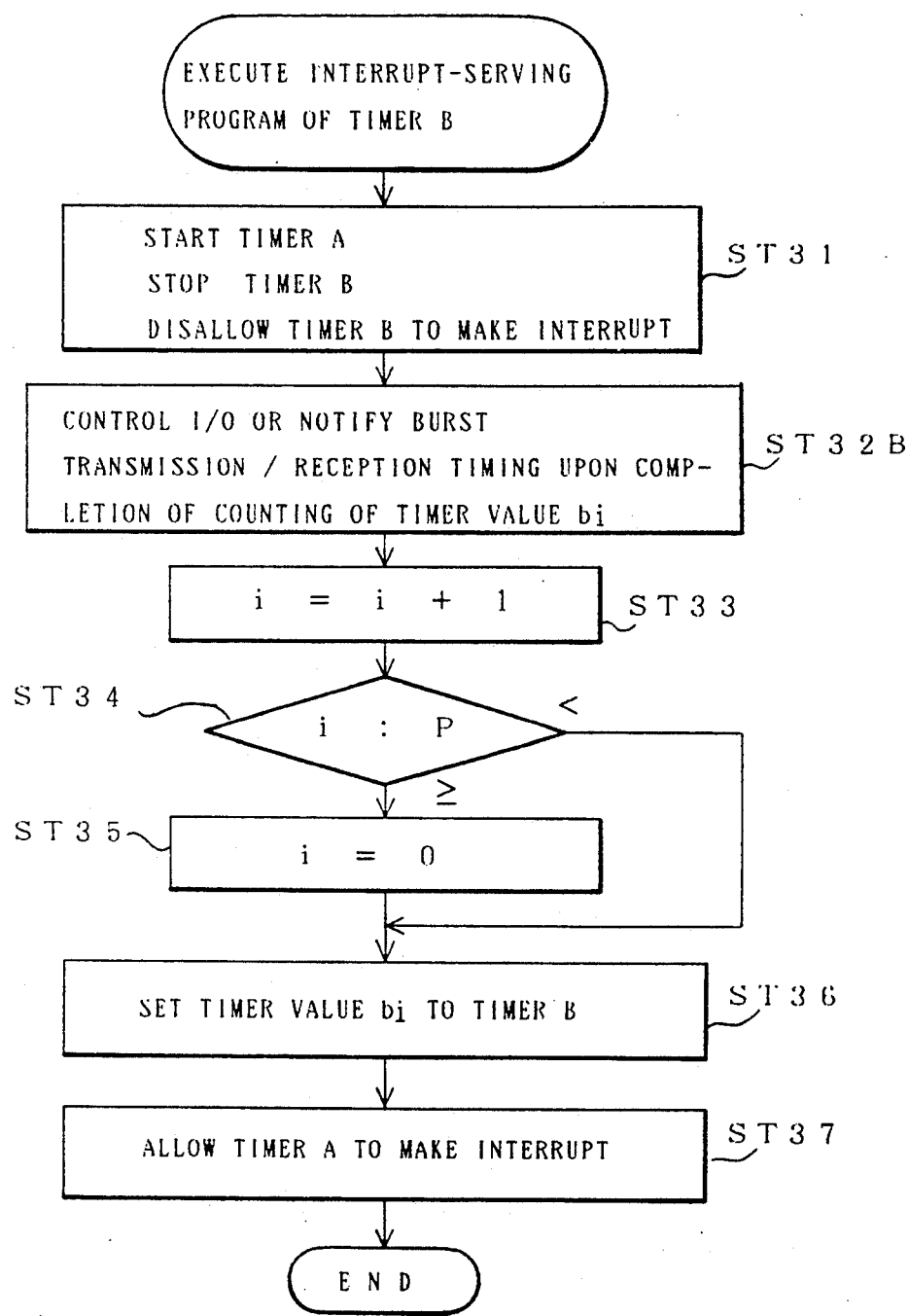
FIG. 17 is a flowchart for describing a program for processing an interrupt caused by a timer B employed in the TDMA processing apparatus depicted in FIG. 11.

Then, a process for allowing the operation of the timer unit 15 is carried out as illustrated in FIG. 15(A). According to the process referred to above, the CPU 12 waits for an interrupt request caused by the count-up of the timer A. Thereafter, an interrupt-serving program identical to each of the interrupt-serving programs (see FIGS. 7 and 8) in the first embodiment is executed. That is, routine processes described in flowcharts shown in FIGS. 16 and 17 are carried out. Thus, the CPU 12 supplies a control signal to each of the peripheral devices such as the control device 32. In this case, the values $a_i$, $b_i$ set to the timers A, B respectively include values corresponding to burst reception timing and burst transmission timing. If the values referred to above included in the preset values $a_i$, $b_i$ in Step ST22B in FIG. 16 and Step ST32B in FIG. 17 correspond to either the burst reception timing or the burst transmission timing, then the CPU 12 issues a message descriptive of such a state.

When each internal state is brought to the synchronous set-up state (Step ST42), the CPU 12 checks (in Step ST48) whether or not a message indicative of the burst reception timing has been notified. If it is determined to be yes, then the CPU 12 receives a reception burst (Step ST49) from the demodulator 33, and checks (in Step ST50) whether or not the synchronizing word is included in the reception burst. If it is determined to be negative in Step ST50, and the absence of the synchronizing word continues over a k frame (where k represents a value determined depending on the conditions of lines or the like) in Step ST51, then the CPU 12 judges this state to be an asynchronous state. Accordingly, the CPU 12 regards each internal state as being a synchronous nonset-up state (Step ST52). As a result, the routine procedure proceeds to a synchronism detecting process (Step ST44).

When the synchronizing word is detected, the CPU 12 performs a process for decomposing or disassembling a reception burst (Step ST53). Then, the CPU 12 performs error control processes such as deinterleave, error correction, etc. with respect to a DATA section and a SACCH section in the reception burst (Step ST54). Thereafter, the CPU 12 delivers the data thus processed to either the control device 32 or the voice codec 35 (Step ST55). Then, the CPU 12 receives SACCH from the control device 32 and DATA from the voice codec 35 (Step ST56), and performs error control processes such as addition of error correcting codes, interleave, etc. with respect to the SACCH and DATA (Step ST57), followed by assembly into the transmission burst 44 (Step ST58). When a message indicative of the burst transmission timing is notified to the CPU 12 (Step ST59), the CPU 12 delivers the transmission burst 44 to the modulator 34 (Step ST60).

Since the TDMA processing apparatus comprises a one-chip microcomputer having a timer unit used to determine the timing for outputting a control signal, as described above, the TDMA processing apparatus can be reduced in size and manufactured at a low cost.

Further, since the TDMA processing apparatus comprises a multi-chip microcomputer having a timer used to decide the timing for outputting a control signal, the TDMA processing apparatus can be reduced in size and manufactured at a low cost. In addition, the degree of freedom to the number of bits of an I/O port can be improved.

Even when the TDMA processing apparatus comprises a one-chip microcomputer having timers used to determine the timing for outputting a control signal and the timing for the transmission and reception of a burst, the TDMA processing apparatus can further be reduced in size and manufactured at a lower cost.

Having now fully described the invention, it will be apparent to those skilled in the art that many changes and modifications can be made without departing from the spirit or scope of the invention as set forth herein.

What is claimed is:

1. A TDMA processing apparatus suitable for use in a communication transmitter/receiver for carrying out a communication service of a TDMA system, said TDMA processing apparatus being activated to supply control signals to peripheral devices employed in said communication transmitter/receiver in accordance with a given timing during a TDMA frame period, said TDMA processing apparatus comprising a one-chip microcomputer, which includes:
   a timer unit for counting input reference clock pulses so as to make an interrupt request when the count reaches a preset value;
   an output port unit for outputting the control signals to said peripheral devices respectively;
   a read only memory unit for storing therein an interrupt-serving program and a program operable to activate said timer unit so as to set a first preset value to said timer unit, said read only memory unit being activated in response to said interrupt request, said interrupt-serving program being operable (a) to set a control signal to said output port unit corresponding to said preset value contributing to the generation of said interrupt request and (b) to set preset values in said timer unit corresponding to the timing for outputting the control signals to be applied to said peripheral devices; and
   a central processing unit for executing said respective programs stored in said read only memory unit.

2. A TDMA processing apparatus according to claim 1, wherein said timer unit has two timer elements and said interrupt-serving program comprises program components corresponding to said two timer elements, each of said program components corresponding to each of said timer elements being used to start the other of said timer element and to preset the value of output timing of said other of said timer elements for a next cycle.

3. A TDMA processing apparatus suitable for use in a communication transmitter/receiver for carrying out a communication service of a TDMA system, said TDMA processing apparatus being activated to supply control signals to peripheral devices employed in said communication transmitter/receiver in accordance with a given timing during a TDMA frame period, said TDMA processing apparatus comprising:
   a timer for counting input reference clock pulses so as to make an interrupt request when the count reaches a preset value;
   an output port for outputting the control signals to said peripheral devices respectively;
   a read only memory for storing therein an interrupt-serving program and a program used to activate said timer so as to set a first preset value to said timer, said read only memory being activated in response to said interrupt request signal, said interrupt-serving program being operable (a) to set a control signal to said output ports corresponding to said preset value contributing to the generation of said interrupt request signal and (b) to set preset value in said timer corresponding to the timing for outputting the control signals to be applied to said peripheral devices; and
   a central processing unit for executing said respective programs stored in said read only memory.

4. A TDMA processing apparatus according to claim 3, wherein said timer, said output port, said read only memory and said central processing unit are components of a digital signal processor.

5. A TDMA processing apparatus according to claim 3, wherein said timer has two timer elements and said interrupt-serving program comprises components corresponding to said two timer elements, each of said program components corresponding to each of said timer elements being used to start the other of said timer elements and to preset the value of output timing of said other of said timer elements for a next cycle.

6. A TDMA processing apparatus suitable for use in a communication transmitter/receiver for performing a communication service of a TDMA system, said TDMA processing apparatus being activated to supply control signals to peripheral devices respectively, wherein said peripheral device include a modulator and a demodulator employed in said communication transmitter/receiver in given timing during a TDMA frame period and to disassemble a reception burst and assemble a transmission burst, said TDMA processing apparatus comprising a one-ship microcomputer, which includes:
   a timer unit for counting input reference clock pulses so as to make an interrupt request when the count reaches a preset value;
   an input/output unit for transmitting the control signals and data to said peripheral devices and receiving data from said peripheral devices;
   a read only memory programming unit for storing therein a program operable to activate said timer unit so as to set a first preset value to said timer unit, said read only programming unit being activated in response to said interrupt request and storing an interrupt-serving program therein which is operable to set a control signal corresponding to said preset value contributing to the generation of said interrupt request to said input/output unit and to preset values to said timer unit corresponding to the timing for outputting the control signals to be applied to said peripheral devices, said read only programming unit also storing therein a program used to receive a reception burst from said demodulator in burst reception timing determined by the execution of said interrupt-serving program so as to disassemble said reception burst and assemble a transmission burst on the basis of data supplied from one of said peripheral devices other than said modulator and said demodulator thereby to deliver said assembled transmission burst to said modulator in burst transmission timing determined by the execution of said interrupt-serving program; and a central processing unit for executing said respective programs stored in said read only programming unit.

7. A TDMA processing apparatus according to claim 6, wherein said timer has two timer elements and said interrupt-serving program comprises components corresponding to said two timer elements, each of said program components corresponding to each of said timer elements being used to start the other of said timer elements and to preset the value of output timing of said other of said timer elements for a next cycle.

8. A TDMA processing apparatus according to claim 7, wherein either one of said two timer elements is used to determine the burst reception timing.

9. A TDMA processing apparatus according to claim 8, wherein either one of said two timer elements is used to determine the burst transmission timing.

10. A communication transmitter/receiver for carrying out a communication service of a TDMA system, said transmitter/receiver comprising:

a demodulator for subjecting given data to a demodulating process so as to generate a reception burst therefrom;

a modulator for subjecting a transmission burst to a modulating process;

a voice codec for digitally coding a voice signal and converting coded data into a voice signal;

a control device for creating control data and analyzing the control data; and a TDMA processing apparatus for supplying control signals to peripheral devices respectively in given timing during a TDMA frame period, said TDMA processing apparatus comprising a one-chip microcomputer, which includes:

a timer unit for counting input reference clock pulses so as to make an interrupt request when the count reaches a preset value;

an input/output unit for transmitting the control signals and data to said peripheral devices and receiving data from said peripheral devices;

a read only programming unit for storing therein a program operable to activate said timer unit so as to set a first preset value to said timer unit, said read only programming unit being activated in response to said interrupt request and storing an interrupt-serving program therein which is operable to set a control signal corresponding to said preset value contributing to the generation of said interrupt request to said input/output unit and to set preset values to said timer unit corresponding to the timing or outputting the control signals to be applied to said peripheral devices, said read only programming unit also storing therein a program operable to receive a reception burst from said demodulator in burst reception timing determined by the execution of said interrupt-serving program so as to disassemble said reception burst and assemble a transmission burst on the basis of data supplied from said voice codec and said control device thereby to deliver said assembled transmission burst to said modulator in burst transmission timing determined by the execution of said interrupt-serving program; and a central processing unit for executing said respective program stored in said read only programming unit.

* * * * *

UNITED STATES PATENT AND TRADEMARK OFFICE
CERTIFICATE OF CORRECTION

PATENT NO. : 5,299,189
DATED : March 29, 1994
INVENTOR(S) : K. Takahashi

It is certified that error appears in the above-identified patent and that said Letters Patent is hereby corrected as shown below:

Figure 15(B), step 18, "INTTERRUPT" should be --INTERRUPT--.

Col. 1, line 20, after "device." start a new paragraph.

Col. 5, line 15, after "$b_0$" do not start a new paragraph.

Col. 10, line 17, "ports" should be --port--.

Col. 10, line 20, "value" should be --values--.

Col. 10, line 42, "device" should be --devices--.

Col. 10, line 47, "one-ship" should be --one-chip--.

Col. 12, line 22, "or" should be --for--.

Signed and Sealed this

Thirtieth Day of August, 1994

Attest:

Attesting Officer

BRUCE LEHMAN

Commissioner of Patents and Trademarks